Figure 2:
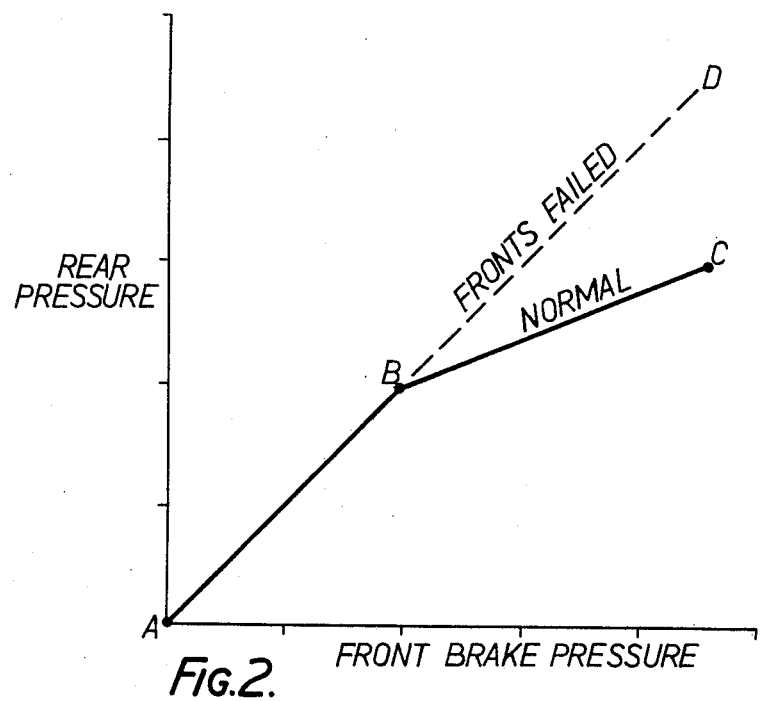

United States Patent [19]

Farr

[11] 4,294,070

[45] Oct. 13, 1981

[54] MASTER CYLINDER ASSEMBLIES

[75] Inventor: Glyn P. R. Farr, Leek Wootton, England

[73] Assignee: Lucas Industries Limited, Birmingham, England

[21] Appl. No.: 89,103

[22] Filed: Oct. 29, 1979

[30] Foreign Application Priority Data

Nov. 2, 1978 [GB] United Kingdom ............... 42910/78

[51] Int. Cl.³ ............................................. B60T 17/22
[52] U.S. Cl. ....................................... 60/534; 60/561; 60/562; 60/591
[58] Field of Search .................. 60/561, 562, 591, 534

[56] References Cited

U.S. PATENT DOCUMENTS

| | | | |
|---|---|---|---|
| 2,162,114 | 6/1939 | Oliver | 60/562 |
| 3,525,552 | 8/1970 | Oberthür | 60/591 |
| 3,972,192 | 8/1976 | Muterel | 60/591 |
| 4,024,712 | 5/1977 | Takeuchi | 60/591 |
| 4,175,392 | 11/1979 | Morimoto | 60/591 |

FOREIGN PATENT DOCUMENTS 2253654 7/1975 France ................................ 60/591

*Primary Examiner*—Abraham Hershkovitz

*Attorney, Agent, or Firm*—Scrivener, Clarke, Scrivener and Johnson

[57] ABSTRACT

A master cylinder assembly for a vehicle braking system having two pressure circuits, comprises a master cylinder having two separate pressure chambers associated with respective pistons one chamber being arranged for connection to one of the pressure circuits, generally the circuit to the front wheel brakes, and a control valve arrangement fast with the master cylinder. The control valve arrangement has an inlet for connection to the other of the chambers and an outlet for connection to the other of the pressure circuits, usually the rear wheel brake circuit, a normally-open valve for controlling communication between the inlet and the outlet, and an auxiliary piston assembly movable to open and close the valve to control the pressure applied to the rear wheel brakes as compared to full braking pressure applied to the front wheel brakes. The auxiliary piston assembly has two portions, one portion being subjected to the outlet pressure of the valve arrangement, and the other portion being subjected to the pressure of the chamber of the master cylinder and being engageable by the adjacent piston of the master cylinder, in the event of failure of pressure in said one pressure circuit, to move the piston to a position in which the valve is held open so that full braking pressure is applied to the rear wheel brakes.

10 Claims, 6 Drawing Figures

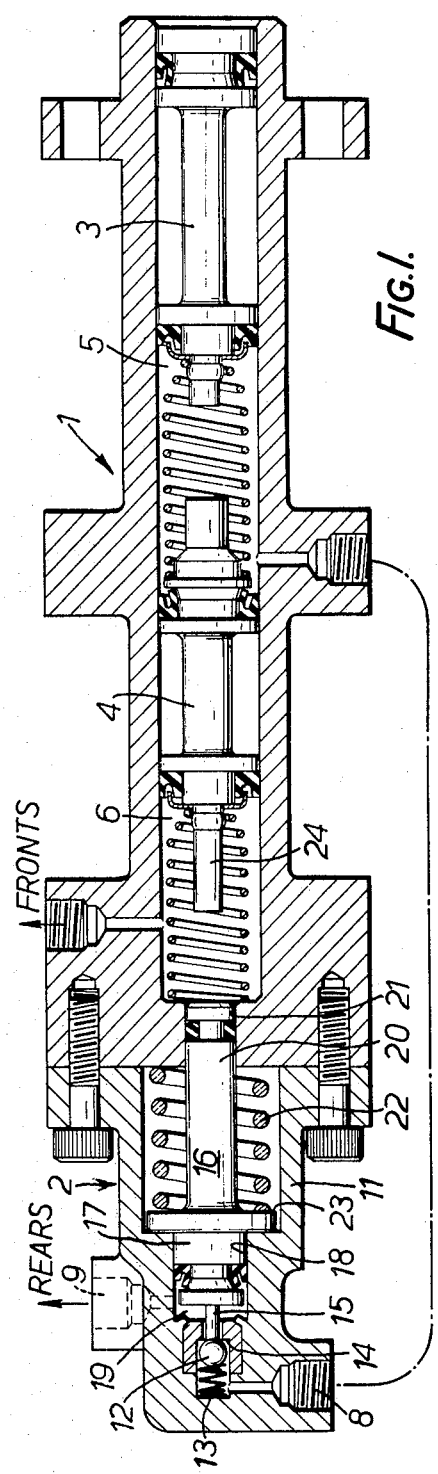
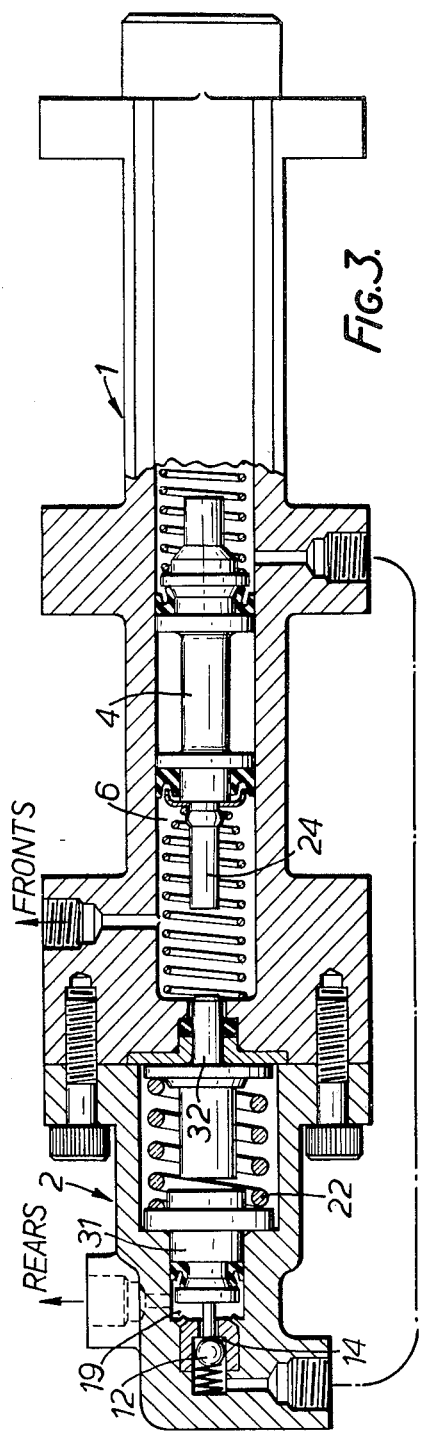

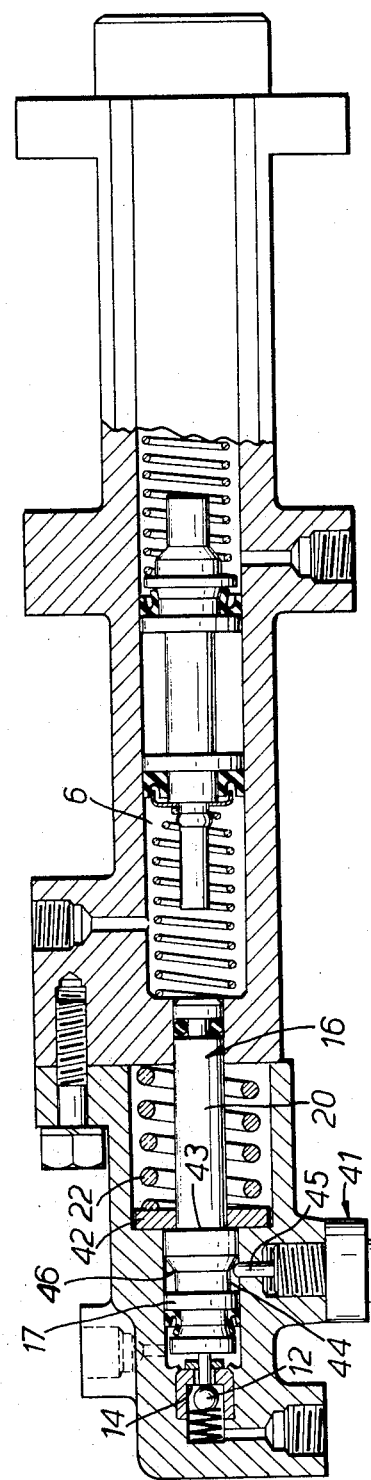

MASTER CYLINDER ASSEMBLIES

This invention relates to master cylinder assemblies for vehicle braking systems.

In known braking systems, a master cylinder is arranged to supply fluid pressure directly to a front wheel brake and indirectly through a control valve arrangement to a rear wheel brake. The control valve arrangement may either reduce the rear brake pressure as compared to the full front brake pressure after a predetermined pressure is attained or limit the rear brake pressure to the predetermined value. The control valve arrangement has a valve controlling communication between an inlet and an outlet which are connected in the rear brake pressure line, the valve being operated by a movable piston which is subjected to full braking pressure in a chamber connected to the master cylinder. In the event of front brake pressure failure, the valve is held open at least under normal braking pressure, to permit full braking pressure to be passed to the rear brakes.

In accordance with the present invention, there is provided a master cylinder assembly for a vehicle braking system having two pressure circuits, comprising a master cylinder having two separate pressure chambers associated with respective pistons, one chamber being arranged for connection to one pressure circuit, and a control valve arrangement fast with the master cylinder, the control valve arrangement having an inlet for connection to the other of said chambers and an outlet for connection to the other of the pressure circuits, a normally-open valve for controlling communication between the inlet and the outlet, and a piston assembly movable to open and close the valve, wherein the piston assembly has two portions, one portion being subjected to the outlet pressure of the valve arrangement and the other portion being subjected to the pressure of said one chamber of the master cylinder and being engageable by the adjacent piston of the master cylinder, in the event of failure of pressure in said one pressure circuit, to move the piston assembly to a position in which the valve is held open.

The piston assembly may be a unitary piston having portions of different cross-sectional area and subjected over its larger area to the pressure at the outlet and at its smaller area to the pressure in the said one chamber of the master cylinder, the piston being resiliently biased in a sense to hold the valve open. In that case the valve arrangement acts as a pressure reducing valve.

Alternatively, the piston assembly comprises two separate piston portions. The portions may be of different cross-sectional area and resiliently biased apart. The larger area piston portion is subjected to the outlet pressure and the smaller area piston portion is subjected to the pressure in the said one chamber of the master cylinder chamber. In this case the control valve arrangement acts as a pressure limiting valve.

The piston portions may be interconnected by a force-transmitting means, preferably a lever, which transmits forces from one piston portion to the other. In this case the piston portions are preferably disposed in parallel relationship.

Figure 4:
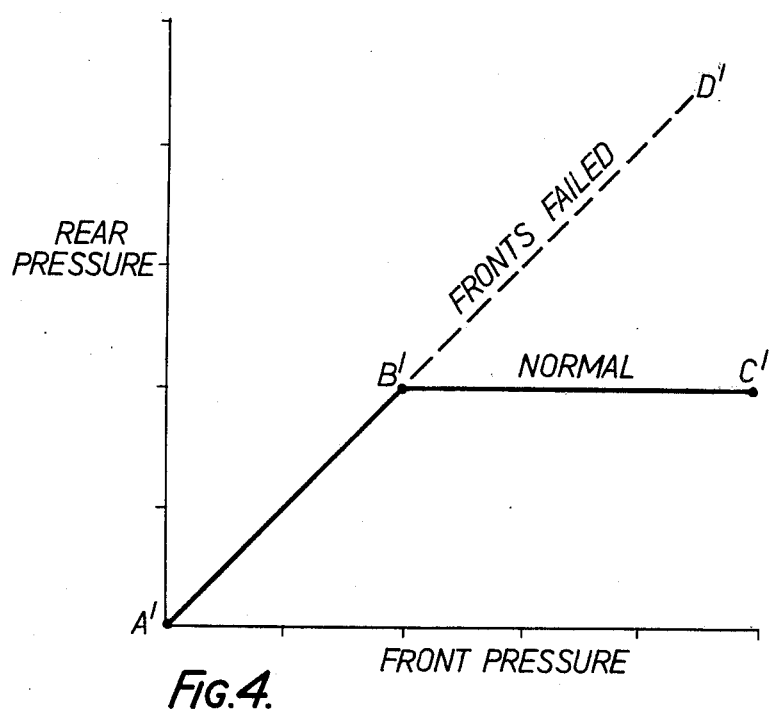

Three forms of master cylinder assembly in accordance with the invention and a modification thereof will now be described, by way of example, with reference to the accompanying drawings, in which:

FIG. 1 is an axial cross-sectional view of one form of master cylinder assembly, FIG. 2 is a graph illustrating the operation of the assembly of FIG. 1, FIG. 3 is an axial cross-sectional view of another form of master cylinder assembly, FIG. 4 is a graph illustrating the operation of the assembly of FIG. 3, FIG. 5 is an axial cross-sectional view of a modification of the form of assembly of FIG. 1, and FIG. 6 is a diagrammatic axial cross-sectional view of yet another form of master cylinder assembly.

Each form of master cylinder assembly comprises a master cylinder 1 and a control valve arrangement 2 which, in use in a vehicle braking system, is arranged to control the pressure applied to the rear wheel brakes as compared to the full braking pressure applied to the front wheel brakes.

The master cylinder 1 has a primary piston 3 and a secondary piston 4 arranged to pressurise respectively a primary chamber 5 and a secondary chamber 6. The primary chamber 5 is in use connected to an inlet 8 of the control valve 2, the outlet 9 of which is in use connected to the rear wheel brakes, and the secondary chamber 6 is connected in use to the front wheel brakes.

In FIG. 1, the control valve arrangement 2 acts as a pressure reducing valve and comprises a housing 11 bolted on to the end of the master cylinder and a valve member in the form of a ball 12 biased by a coil compression spring 13 towards a valve seat 14. The ball 12 is normally held off the seat 14 by extension 15 of a differential area piston 16. The larger diameter portion 17 of the piston 16 is sealingly slidable in a bore 18 of the housing 11 and is subjected to the pressure in a valve outlet chamber 19. The smaller diameter portion 20 of the piston is sealingly slidable in a bore 21 of the master cylinder and is subjected to the pressure prevailing in the secondary chamber 6. A coil compression spring 22 engages a shoulder 23 on the piston 16 and seats against the end of the master cylinder to bias the piston 16 in a sense to hold the valve 12, 14 open, as illustrated in FIG. 1.

In normal operation, actuation of the brake pedal (not shown) urges the primary piston 3 and consequently the secondary piston 4 to the left to pressurise the chambers 5, 6 and transmit fluid to the front and rear wheel brakes as illustrated on line A-B of the front brake pressure vs. rear brake pressure curve of FIG. 2. When the pressure in the primary chamber 5 reaches a predetermined value such that the force of pressure in valve chamber 19 acting on piston portion 17 is sufficient to overcome the force of spring 22 in addition to the force of the pressure in secondary chamber 6 acting on the smaller piston portion 20, the piston 16 moves to the right and the ball 12 engages the seat 14 to close the valve. Further increase in master cylinder pressure meters pressure to the rear brakes by opening and closing the valve 12, 14 in known manner, the pressure passed to the rear brakes being reduced as compared to the front brake pressure, as illustrated by curve B-C in FIG. 2.

If there is a failure in the circuit to the front brakes, actuation of the master cylinder will cause the secondary piston 4 to bottom in the master cylinder and an extension 24 of the secondary piston abuts the differential area piston 16 to hold the valve 12, 14 open, thereby permitting full braking pressure to pass to the rear brakes through the valve, since the cross-sectional area of primary piston 3 is greater than the cross-sectional area of the larger portion 17 of differential area piston 16. The resultant pressure curve is illustrated at B-D in FIG. 2.

Failure of the rear brake circuit will result in the primary piston 3 engaging the secondary piston 4 upon actuation of the master cylinder, the full braking pressure thereby being applied to the front brake circuit.

The assembly of FIG. 3 is generally similar to that of FIG. 1 and corresponding parts have been given the same reference numerals. The main difference is that the control valve arrangement 2 acts as a pressure limiting valve, the differential area piston 16 being replaced by two separate pistons 31, 32 of different cross-sectional areas and the spring 22 acting between the two pistons 31, 32.

In this form of assembly, at low pressures the master cylinder supplies full fluid pressure directly to the front brakes, and through the open control valve to the rear brakes, as shown by curve A'-B' in FIG. 4. When a predetermined pressure is attained, at which the force of fluid pressure in valve outlet chamber 19 acting on piston 31 overcomes the force of spring 22, the piston 31 moves to the right and the ball 12 engages the seat 14 to close the valve.

The smaller piston 32 has a cross-sectional area such that it cannot overcome the spring force even at maximum pressure in secondary chamber 6. Thus, the rear brake pressure does not increase with increased master cylinder pressure, as illustrated at B'-C' in FIG. 4.

Should the front brake pressure circuit fail, the extension 24 of the secondary piston 4 abuts the smaller piston 32 and pushes it against the larger piston 31. Since the cross-sectional area of piston 31 is smaller than the cross-sectional area of the secondary piston 4, the ball valve is held open and the full braking pressure is applied to the rear brakes, as shown in curve B'-D' of FIG. 4.

In the event of failure of the rear brake circuit, the ball valve remains open since the force of the secondary chamber pressure acting on the smaller piston 32 cannot overcome the force of spring 22.

The assembly of FIG. 3 has the advantage that a rapid actuation of the master cylinder will not cause permanent over-braking of the rear wheel brakes. If there is a sudden increase in master cylinder pressure, the valve 12, 14 will close and the high pressure in valve chamber 19 will move the larger piston 32 to the right against the force of spring 22, thereby expanding the chamber 19 and reducing the rear brake pressure until that pressure is correct for the prevailing master cylinder pressure.

FIG. 5 illustrates an assembly similar to that of FIG. 1, but incorporating a pressure differential warning actuator 41 of any suitable form, and corresponding parts are denoted by the same reference numerals. In the assembly of FIG. 5, the spring 22 is caged and engages a washer 42 instead of the shoulder 23 of FIG. 1, the washer 42 normally seating on a shoulder 43 of the piston 16. Additionally, the piston 16 has a recess 44 into which plunger 45 of the warning actuator 41 projects.

If the rear brake pressure falls below a predetermined level during a brake application, the front brake pressure in chamber 6, acting over the area of the righthand end-face of piston 16, urges the piston 16 leftwardly. If the front brake pressure fails, the piston 4 is urged leftwardly by the pressure in chamber 5 acting on the righthand end of piston 4, so that the lefthand end extension 24 engages the righthand end of piston 16, thereby urging the piston 16 leftwardly as before. Thus in the event of failure of either of the pressure circuits, the piston 16 moves to the left to hold the valve 12,14 open and the plunger 45 rides up a frusto-conical surface 46 of the piston 16 to operate the warning actuator. When full braking pressure is restored the piston 16 automatically moves to the right when the master cylinder is operated and the warning actuator is thereby automatically reset.

In the form of valve assembly of FIG. 6, the valve assembly housing 11 is integral with the master cylinder 1 and is laterally of the master cylinder axis. The piston assembly comprises two separate pistons 51, 52 of different cross-sectional areas acting on respective ends of a force-transmitting lever 53 pivoted at 54. The piston 52 is biased by spring 22 to a position in which it holds the valve 2 open.

Operation of this assembly is similar to those described above. At low pressures, the master cylinder supplies full fluid pressure through the open control valve to the rear brakes. When the force of the fluid pressure in valve outlet chamber 19 acting on piston 52 overcomes the force of spring 22 together with the force transmitted by lever 53 to the piston 52, the piston 52 moves to the left and the valve 2 closes. The lever ratio of lever 53 can be so chosen that the transmitted force and the force of spring 22 cannot overcome the force of fluid pressure in the valve outlet chamber 19, even at maximum braking pressure in chamber 6, in which case the valve acts as a pressure limiting valve and the valve does not re-open until the braking pressure is again reduced. Alternatively, the lever ratio could be chosen such that further increase in pressure in chamber 6 after valve 2 closes provides a force on piston 52 sufficient to open the valve 2, thus increasing the outlet pressure, the valve thereafter successively closing and opening to meter pressure to the rear brakes at a reduced rate as compared to the master cylinder pressure.

In the event of failure of the front wheel pressure circuit, the piston 4 bottoms in the cylinder when the brakes are actuated and the extension 24 engages piston 51 applying a force to the piston which is transmitted through the lever 53 to the piston 52 which thereby holds the valve 2 open. If the rear wheel pressure circuit should fail, the valve is held open due to the absence of fluid pressure in outlet chamber 19.

The assembly of FIG. 6 has the advantage that the length of the assembly is substantially less that the length of the assemblies of FIGS. 1 and 3.

Although only the master cylinder assembly of FIG. 5 shows a pressure differential warning actuator operable in response to excess movement of the auxiliary piston 16, each of the other above-described assemblies could be adapted to incorporate a pressure differential warning actuator.

It will be appreciated that the above-described assemblies reduce the amount of pipework and the number of seals required as compared to known assemblies in which a pressure limiting or reducing valve is separate from the master cylinder and connected in the line to the rear brake circuit, with a pressure line from the front brake circuit also being connected to the valve. Another advantage is that all the pistons operate during normal braking so that there are no "redundant members", i.e. members that operate only upon failure of one of the pressure circuits.

I claim:

1. A master cylinder assembly for a vehicle braking system having two pressure circuits, comprising a master cylinder, two pistons working in said cylinder and defining two separate pressure chambers, one chamber being arranged for connection to one of said pressure circuits, and a control valve means fast with the master cylinder, said control valve means having an inlet for connection to the other of said chambers and an outlet for connection to the other of said pressure circuits, a normally-open valve for controlling communication between said inlet and said outlet, and an auxiliary piston assembly movable to open and close said valve, wherein the auxiliary piston assembly has two portions, one portion being subjected to the pressure at said outlet of said valve arrangement and the other portion being subjected to the pressure of said one chamber of said master cylinder and being engageable by an adjacent one of said pistons of the master cylinder, in the event of failure of pressure in said one pressure circuit, whereby said piston assembly is moved to a position in which said valve is held open.

2. A master cylinder assembly according to claim 1, including resilient biasing means which biases said auxiliary piston assembly in a sense to hold said valve open.

3. A master cylinder assembly according to claim 1, wherein said auxiliary piston assembly is a unitary piston.

4. A master cylinder assembly according to claim 1, wherein said piston portions are separate portions.

5. A master cylinder assembly according to claim 4, including resilient biasing means which biases said portions apart.

6. A master cylinder assembly according to claim 1, wherein said piston portions have different cross-sectional areas, the larger area being subjected to the pressure at said outlet and the smaller area being subjected to the pressure in said one chamber.

7. A master cylinder assembly according to claim 4, including force-transmitting means which interconnects said piston portions and which transmits the force from one piston portion to the other, said force-transmitting means being a lever arrangement.

8. A master cylinder assembly according to claim 1, wherein said piston portions are axially aligned.

9. A master cylinder assembly according to claim 1, wherein said piston portions are parallel.

10. A master cylinder assembly according to claim 1, including a pressure differential warning actuator associated with said auxiliary piston and operable in response to excess movement of said auxiliary piston.

* * * * *